United States Patent
Qi et al.

(10) Patent No.: US 12,438,147 B2
(45) Date of Patent: Oct. 7, 2025

(54) LITHIUM-CONTAINING PARTICLE COATINGS FOR POSITIVE ELECTROACTIVE MATERIALS

(71) Applicant: GM GLOBAL TECHNOLOGY OPERATIONS LLC, Detroit, MI (US)

(72) Inventors: Gongshin Qi, Troy, MI (US); Wei Li, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 647 days.

(21) Appl. No.: 17/742,037

(22) Filed: May 11, 2022

(65) Prior Publication Data

US 2023/0369568 A1 Nov. 16, 2023

(51) Int. Cl.
*H01M 4/36* (2006.01)
*H01M 4/505* (2010.01)
(Continued)

(52) U.S. Cl.
CPC .......... *H01M 4/366* (2013.01); *H01M 4/505* (2013.01); *H01M 4/525* (2013.01);
(Continued)

(58) Field of Classification Search
CPC ...... H01M 4/366; H01M 4/505; H01M 4/525; H01M 10/0525; H01M 2004/021; H01M 2004/028; H01M 2220/20; H01M 4/131
See application file for complete search history.

(56) References Cited

U.S. PATENT DOCUMENTS

2019/0157658 A1* 5/2019 Lee ................ H01M 4/366

2020/0388842 A1* 12/2020 Choi ............... H01M 10/0525
2021/0280863 A1* 9/2021 Liu ................. H01M 10/0525

FOREIGN PATENT DOCUMENTS

| CN | 103943844 A | * | 7/2014 | ............ H01M 4/505 |
| CN | 117096295 A | | 11/2023 | |
| DE | 102022128284 A1 | | 11/2023 | |

OTHER PUBLICATIONS

Chong, Shaokun, et al. "A strategy of constructing spherical core-shell structure of Li1. 2Ni0. 2Mn0. 6O2@ Li1. 2Ni0. 4Mn0. 4O2 cathode material for high-performance lithium-ion batteries." Journal of Power Sources 356 (2017): 153-162. (Year: 2017).*

(Continued)

*Primary Examiner* — Milton I Cano
*Assistant Examiner* — Albert Michael Hilton
(74) *Attorney, Agent, or Firm* — Harness, Dickey & Pierce, P.L.C.

(57) ABSTRACT

A positive electrode material is provided. The positive electrode material includes an electroactive material core and an electrochemically active coating that surrounds the electroactive material core. The electroactive material core includes $Li_{1+x}M_{1-x}O_2$, where $0 \leq x \leq 0.5$ and M is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating includes $Li_{1+x}M'_{1-x}O_2$, where $0 \leq x \leq 0.2$ and M' is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating is a distinct composition from the electroactive material core.

6 Claims, 1 Drawing Sheet

(51) Int. Cl.
  *H01M 4/525*    (2010.01)
  *H01M 10/0525*  (2010.01)
  *H01M 4/02*         (2006.01)

(52) U.S. Cl.
  CPC .. *H01M 10/0525* (2013.01); *H01M 2004/021* (2013.01); *H01M 2004/028* (2013.01); *H01M 2220/20* (2013.01)

(56) References Cited

OTHER PUBLICATIONS

Machine translation of CN103943844A (Year: 2025).*
Ju, Xiaokang et al.; "The full gradient design in Li-rich cathode for high performance lithium ion batteries with reduced voltage decay"; Journal of Power Sources 437 (Jul. 2019) 226902; 9 pages.
Jun, Do-Wook et al.; "High-Energy Density Core-Shell Structured Li[Ni0.95Co0.025Mn0.025]O2 Cathode for Lithium-Ion Batteries"; Department of Energy Engineering, Hanyang University, Seoul 04763, South Korea and Department of Energy Engineering, Hanyang University, Seoul 04763, South Korea; American Chemical Society; Jun. 3, 2017; 9 pages.
Song, Liubin et al.; "Core-shell structure LiNi0.8Co0.1Mn0.1O2 cathode material with improved electrochemical performance at high voltage"; Ionics 27; (Jan. 12, 2021); pp. 949-959.

* cited by examiner

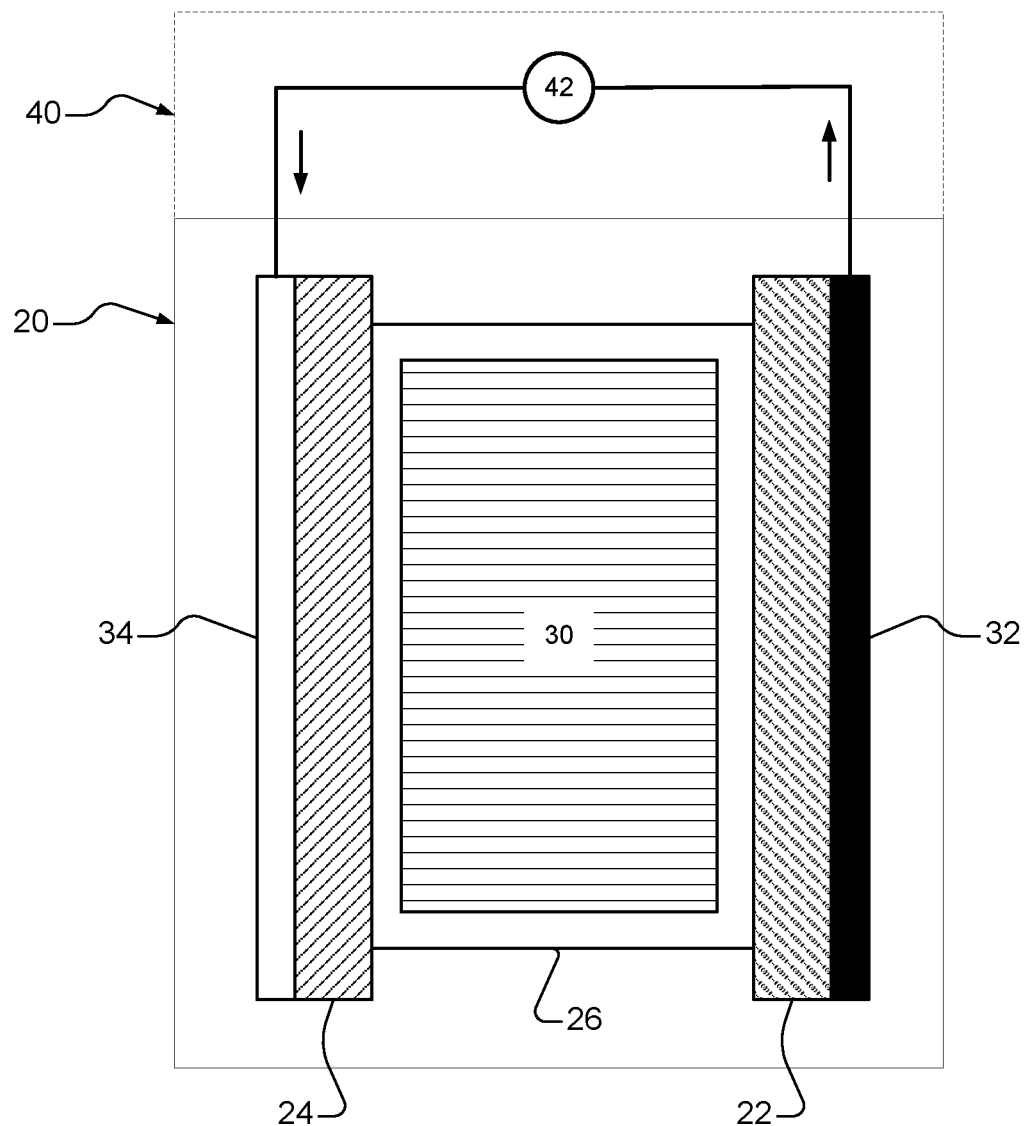

LITHIUM-CONTAINING PARTICLE COATINGS FOR POSITIVE ELECTROACTIVE MATERIALS

INTRODUCTION

This section provides background information related to the present disclosure which is not necessarily prior art.

Advanced energy storage devices and systems are in demand to satisfy energy and/or power requirements for a variety of products, including automotive products such as start-stop systems (e.g., 12V start-stop systems), battery-assisted systems, hybrid electric vehicles ("HEVs"), and electric vehicles ("EVs"). Typical lithium-ion batteries include at least two electrodes and an electrolyte and/or separator. One of the two electrodes may serve as a positive electrode or cathode and the other electrode may serve as a negative electrode or anode. A separator and/or electrolyte may be disposed between the negative and positive electrodes. The electrolyte is suitable for conducting lithium ions between the electrodes and, like the two electrodes, may be in solid and/or liquid form and/or a hybrid thereof. In instances of solid-state batteries, which include solid-state electrodes and a solid-state electrolyte, the solid-state electrolyte may physically separate the electrodes so that a distinct separator is not required.

Many different materials may be used to create components for a lithium-ion battery. For example, in various aspects, positive electrodes include nickel-rich electroactive materials (e.g., greater than or equal to about 0.6 mole fraction on transition metal lattice), such as NMC ($LiNi_{1-x-y}Co_xMn_yO_2$) (where $0.10 \leq x \leq 0.33$, $0.10 \leq y \leq 0.33$) or NCMA ($LiNi_{1-x-y-z}Co_xMn_yAl_zO_2$) (where $0.02 \leq x \leq 0.20$, $0.01 \leq y \leq 0.12$, $0.01 \leq z \leq 0.08$), which are capable of providing improved capacity capability (e.g., greater than 200 mAh/g) while allowing for additional lithium extraction without compromising the structural stability of the positive electrode. Such materials, however, have high surface reactivities, and as such, are often susceptible to material loss, for example, resulting from chemical oxidation of the electrolyte during battery operation. These reactions are often exothermic and commonly impact the thermostability and longevity of battery cells. Accordingly, it would be desirable to develop improved electrodes and electroactive materials, and methods of using the same, that can address these challenges.

SUMMARY

This section provides a general summary of the disclosure, and is not a comprehensive disclosure of its full scope or all of its features.

The present disclosure relates to lithium-containing particle coatings for positive electroactive materials, and to methods of forming and using the same.

In various aspects, the present disclosure a positive electrode material. The positive electrode material may include an electroactive material core and an electrochemically active coating that surrounds the electroactive material core. The electroactive material core may include $Li_{1+x}M_{1-x}O_2$, where $0 \leq x \leq 0.5$ and M is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating may include $Li_{1+x}M'_{1-x}O_2$, where $0 \leq x \leq 0.2$ and M' is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating may be a distinct composition from the electroactive material core.

In one aspect, the electroactive material core may have an average particle diameter greater than or equal to about 1 μm to less than or equal to about 30 μm, and the electrochemically active coating may have an average thickness greater than or equal to about 1 μm to less than or equal to about 10 μm.

In one aspect, the electrochemically active coating may cover greater than or equal to about 85% of a total surface area of the electroactive material core.

In one aspect, M in the electroactive material core may include manganese (Mn). The electroactive material may include a first amount of manganese (Mn).

In one aspect, the M' in the electrochemically active coating may include manganese (Mn). The electrochemically active coating may have a second amount of manganese (Mn). The first amount of manganese (Mn) being different from the second amount of manganese (Mn). For example, the first amount of manganese (Mn) may be greater than the second amount of manganese (Mn).

In one aspect, $Li_{1.2}Ni_{0.24}Mn_{0.56}O_2$, and the $Li_{1.2}Ni_{0.36}Mn_{0.44}O_2$.

In one aspect, $Li_{1.2}Ni_yMn_zO_2$, where $0.05 \leq y \leq 0.5$ and $0.3 \leq z \leq 0.75$.

In one aspect, the electrochemically active coating may include $Li_{1.2}Ni_yMn_zO_2$, where $0.2 \leq y \leq 0.5$ and $0.3 \leq z \leq 0.6$.

In various aspects, the present disclosure provides an electrochemical cell that cycles lithium ions. The electrochemical cell includes a positive electrode, a negative electrode, and a separating layer physically separating the positive electrode and the negative electrode. The positive electrode may include a plurality of positive the electroactive material core may include electrochemically active coating may include the electroactive material core may include electroactive material particles. Each of the positive electroactive material particles may include an electroactive material core and an electrochemically active coating that surrounds the electroactive material core. The electroactive material core may include $Li_{1+x}M_{1-x}O_2$, where $0 \leq x \leq 0.5$, where M is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating may include $Li_{1+x}M'_{1-x}O_2$, where $0 \leq x \leq 0.2$ and M' is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. The electrochemically active coating may be a distinct composition from the electroactive material core.

In one aspect, the electroactive material core may have an average particle diameter greater than or equal to about 1 μm to less than or equal to about 30 μm, and the electrochemically active coating may have an average thickness greater than or equal to about 1 μm to less than or equal to about 10 μm.

In one aspect, the electrochemically active coating may cover greater than or equal to about 85% of a total surface area of the electroactive material core.

In one aspect, the M in the electroactive material core may include manganese (Mn). The electroactive material core may have a first amount of manganese (Mn).

In one aspect, the M' in the electrochemically active coating may include manganese (Mn). The electrochemically active coating may have a second amount of manganese (Mn). The first amount of manganese (Mn) may be different from the second amount of manganese. For example, the first amount of manganese (Mn) may be greater than the second amount of manganese (Mn).

In one aspect, the electroactive material core may include $Li_{1.2}Ni_{0.24}Mn_{0.56}O_2$, and the electrochemically active coating may include $Li_{1.2}Ni_{0.36}Mn_{0.44}O_2$.

In one aspect, the electroactive material core may include $Li_{1.2}Ni_yMn_zO_2$, where $0.05 \leq y \leq 0.5$ and $0.3 \leq z \leq 0.75$.

In one aspect, the electrochemically active coating may include $Li_{1.2}Ni_yMn_zO_2$, where $0.2 \leq y \leq 0.5$ and $0.3 \leq z \leq 0.6$.

In various aspects, the present disclosure provides a method for forming a positive electrode material that includes a plurality of coated electroactive material particles. The method may include contacting a plurality of precursor electroactive material particles and one or more coating materials to form a precursor assembly. The precursor electroactive material particles may include $Ni_xMn_yCO_3$, where $0.1 \leq x \leq 0.5$ and $0.5 \leq y \leq 0.9$ and $x+y=1$. The one or more coating materials may also include $Ni_xMn_yCO_3$, where $0.25 \leq x \leq 0.6$ and $0.4 \leq y \leq 0.75$ and $x+y=1.0$. The one or more coating materials, however, being a distinct composition from the precursor electroactive material particles. The method may further include contacting the precursor assembly and one or more lithium salts to form the positive electrode material. The positive electrode material may include an electroactive material core and electrochemically active coating surrounding the electroactive material core.

In one aspect, the precursor electroactive material particles may include $Ni_{0.3}Mn_{0.7}CO_3$, and the one or more coating materials may include $Ni_{0.45}Mn_{0.55}CO_3$.

In one aspect, the electroactive material core may include $Li_{1.2}Ni_yMn_zO_2$, where $0.05 \leq y \leq 0.5$ and $0.3 \leq z \leq 0.75$, and the electrochemically active coating may include $Li_{1.2}Ni_yMn_zO_2$, where $0.2 \leq y \leq 0.5$ and $0.3 \leq z \leq 0.6$.

In one aspect, the electroactive material core may include $Li_{1.2}Ni_{0.24}Mn_{0.56}O_2$, and the electrochemically active coating may include $Li_{1.2}Ni_{0.36}Mn_{0.44}O_2$.

Further areas of applicability will become apparent from the description provided herein. The description and specific examples in this summary are intended for purposes of illustration only and are not intended to limit the scope of the present disclosure.

BRIEF DESCRIPTION OF THE DRAWING

The drawing described herein are for illustrative purposes only of selected embodiments and not all possible implementations, and are not intended to limit the scope of the present disclosure.

FIG. 1 is an illustration of an example electrochemical cell including a positive electroactive material coated with a lithium-containing particle coating in accordance with various aspects of the present disclosure.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the FIGURES. Spatially or temporally relative terms may be intended to encompass different orientations of the device or system in use or operation in addition to the orientation depicted in the FIGURES.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates both exactly or precisely the stated numerical value, and also, that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawing.

The present technology relates to electrochemical cells including positive electroactive materials coated with lithium-containing particle coatings, and also, to batteries including the electrochemical cells. Such cells and batteries are used in vehicle or automotive transportation applications (e.g., motorcycles, boats, tractors, buses, motorcycles, mobile homes, campers, and tanks). However, the present technology may be employed in a wide variety of other industries and applications, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. Further, although the illustrated examples detail below include a single positive electrode cathode and a single anode, the skilled artisan will recognize that the present teachings also extend to various other configurations, including those having one or more cathodes and one or more anodes, as well as various current collectors with electroactive material layers disposed on or adjacent to one or more surfaces thereof.

An exemplary and schematic illustration of an example electrochemical cell (also referred to as a battery) 20 is shown in FIG. 1. The battery 20 includes a negative electrode 22 (e.g., anode), a positive electrode 24 (e.g., cathode), and a separator 26 disposed between the two electrodes 22, 24. The separator 26 provides electrical separation-prevents physical contact-between the electrodes 22, 24. The separator 26 also provides a minimal resistance path for internal passage of lithium ions, and in certain instances, related anions, during cycling of the lithium ions. In various aspects, the separator 26 comprises an electrolyte 30 that may, in certain aspects, also be present in the negative electrode 22 and positive electrode 24. In certain variations, the separator 26 may be formed by a solid-state electrolyte or a semi-solid-state electrolyte (e.g., gel electrolyte). For example, the separator 26 may be defined by a plurality of solid-state electrolyte particles (not shown). In the instance of solid-state batteries and/or semi-solid-state batteries, the positive electrode 24 and/or the negative electrode 22 may include a plurality of solid-state electrolyte particles (not shown). The plurality of solid-state electrolyte particles included in, or defining, the separator 26 may be the same as or different from the plurality of solid-state electrolyte particles included in the positive electrode 24 and/or the negative electrode 22.

A first current collector 32 (e.g., a negative electro current collector) may be positioned at or near the negative electrode 22. The first current collector 32 may be a metal foil, metal grid or screen, or expanded metal comprising copper or any other appropriate electrically conductive material known to those of skill in the art. A second current collector 34 (e.g., a positive electrode current collector) may be positioned at or near the positive electrode 24. The second electrode current collector 34 may be a metal foil, metal grid or screen, or expanded metal comprising aluminum or any other appropriate electrically conductive material known to those of skill in the art. The first current collector 32 and the second current collector 34 may respectively collect and move free electrons to and from an external circuit 40. For example, an interruptible external circuit 40 and a load device 42 may connect the negative electrode 22 (through the first current collector 32) and the positive electrode 24 (through the second current collector 34).

The battery 20 can generate an electric current during discharge by way of reversible electrochemical reactions that occur when the external circuit 40 is closed (to connect the negative electrode 22 and the positive electrode 24) and the negative electrode 22 has a lower potential than the positive electrode. The chemical potential difference between the positive electrode 24 and the negative electrode 22 drives electrons produced by a reaction, for example, the oxidation of intercalated lithium, at the negative electrode 22 through the external circuit 40 toward the positive electrode 24. Lithium ions that are also produced at the negative electrode 22 are concurrently transferred through the electrolyte 30 contained in the separator 26 toward the positive electrode 24. The electrons flow through the external circuit 40 and the lithium ions migrate across the separator 26 containing the electrolyte 30 to form intercalated lithium at the positive electrode 24. As noted above, the electrolyte 30 is typically also present in the negative electrode 22 and positive electrode 24. The electric current passing through the external circuit 40 can be harnessed and directed through the load device 42 until the lithium in the negative electrode 22 is depleted and the capacity of the battery 20 is diminished.

The battery 20 can be charged or re-energized at any time by connecting an external power source to the lithium ion battery 20 to reverse the electrochemical reactions that occur during battery discharge. Connecting an external electrical energy source to the battery 20 promotes a reaction, for example, non-spontaneous oxidation of intercalated lithium, at the positive electrode 24 so that electrons and lithium ions are produced. The lithium ions flow back toward the negative electrode 22 through the electrolyte 30 across the separator 26 to replenish the negative electrode 22 with lithium (e.g., intercalated lithium) for use during the next battery discharge event. As such, a complete discharging event followed by a complete charging event is considered to be a cycle, where lithium ions are cycled between the positive electrode 24 and the negative electrode 22. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator.

In many lithium-ion battery configurations, each of the first current collector 32, negative electrode 22, separator 26, positive electrode 24, and second current collector 34 are prepared as relatively thin layers (for example, from several microns to a fraction of a millimeter or less in thickness) and assembled in layers connected in electrical parallel arrangement to provide a suitable electrical energy and power package. In various aspects, the battery 20 may also include a variety of other components that, while not depicted here, are nonetheless known to those of skill in the art. For instance, the battery 20 may include a casing, gaskets, terminal caps, tabs, battery terminals, and any other conventional components or materials that may be situated within the battery 20, including between or around the negative electrode 22, the positive electrode 24, and/or the separator 26. The battery 20 shown in FIG. 1 includes a liquid electrolyte 30 and shows representative concepts of battery operation. However, as noted above, the present technology also applies to solid-state batteries and/or semi-solid state batteries that include solid-state electrolytes and/or solid-state electrolyte particles and/or semi-solid electrolytes and/or solid-state electroactive particles that may have different designs as known to those of skill in the art.

The size and shape of the battery 20 may vary depending on the particular application for which it is designed. Battery-powered vehicles and hand-held consumer electronic devices, for example, are two examples where the battery 20 would most likely be designed to different size, capacity, and power-output specifications. The battery 20 may also be connected in series or parallel with other similar lithium-ion cells or batteries to produce a greater voltage output, energy, and power if it is required by the load device 42. Accordingly, the battery 20 can generate electric current to a load device 42 that is part of the external circuit 40. The load device 42 may be powered by the electric current passing through the external circuit 40 when the battery 20 is discharging. While the electrical load device 42 may be any number of known electrically-powered devices, a few specific examples include an electric motor for an electrified vehicle, a laptop computer, a tablet computer, a cellular phone, and cordless power tools or appliances. The load device 42 may also be an electricity-generating apparatus that charges the battery 20 for purposes of storing electrical energy.

With renewed reference to FIG. 1, the positive electrode 24, the negative electrode 22, and the separator 26 may each include an electrolyte solution or system 30 inside their pores, capable of conducting lithium ions between the negative electrode 22 and the positive electrode 24. Any appropriate electrolyte 30, whether in solid, liquid, or gel form, capable of conducting lithium ions between the negative electrode 22 and the positive electrode 24 may be used in the lithium-ion battery 20. For example, in certain aspects, the electrolyte 30 may be a non-aqueous liquid electrolyte solution (e.g., >1 M) that includes a lithium salt dissolved in an organic solvent or a mixture of organic solvents. Numerous conventional non-aqueous liquid electrolyte 30 solutions may be employed in the battery 20.

A non-limiting list of lithium salts that may be dissolved in an organic solvent to form the non-aqueous liquid electrolyte solution include lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof. These and other similar lithium salts may be dissolved in a variety of non-aqueous aprotic organic solvents, including but not limited to, various alkyl carbonates, such as cyclic carbonates (e.g., ethylene carbonate (EC), propylene carbonate (PC), butylene carbonate (BC), fluoroethylene carbonate (FEC)), linear carbonates (e.g., dimethyl carbonate (DMC), diethyl carbonate (DEC), ethylmethylcarbonate (EMC)), aliphatic carboxylic esters (e.g., methyl formate, methyl acetate, methyl propionate), γ-lactones (e.g., γ-butyrolactone, γ-valerolactone), chain structure ethers (e.g., 1,2-dimethoxyethane, 1-2-diethoxyethane, ethoxymethoxyethane), cyclic ethers (e.g., tetrahydrofuran, 2-methyltetrahydrofuran), 1,3-dioxolane), sulfur compounds (e.g., sulfolane), and combinations thereof.

The porous separator 26 may include, in certain instances, a microporous polymeric separator including a polyolefin. The polyolefin may be a homopolymer (derived from a single monomer constituent) or a heteropolymer (derived from more than one monomer constituent), which may be either linear or branched. If a heteropolymer is derived from two monomer constituents, the polyolefin may assume any copolymer chain arrangement, including those of a block copolymer or a random copolymer. Similarly, if the polyolefin is a heteropolymer derived from more than two monomer constituents, it may likewise be a block copolymer or a random copolymer. In certain aspects, the polyolefin may be polyethylene (PE), polypropylene (PP), or a blend of polyethylene (PE) and polypropylene (PP), or multi-layered structured porous films of PE and/or PP. Commercially available polyolefin porous separator membranes 26 include CELGARD® 2500 (a monolayer polypropylene separator) and CELGARD® 2320 (a trilayer polypropylene/polyethylene/polypropylene separator) available from Celgard LLC.

When the separator 26 is a microporous polymeric separator, it may be a single layer or a multi-layer laminate, which may be fabricated from either a dry or a wet process. For example, in certain instances, a single layer of the polyolefin may form the entire separator 26. In other aspects, the separator 26 may be a fibrous membrane having an abundance of pores extending between the opposing surfaces and may have an average thickness of less than a millimeter, for example. As another example, however, multiple discrete layers of similar or dissimilar polyolefins may be assembled to form the microporous polymer separator 26. The separator 26 may also comprise other polymers in addition to the polyolefin such as, but not limited to, polyethylene terephthalate (PET), polyvinylidene fluoride (PVdF), a polyamide, polyimide, poly(amide-imide) copolymer, polyetherimide, and/or cellulose, or any other material suitable for creating the required porous structure. The polyolefin layer, and any other optional polymer layers, may further be included in the separator 26 as a fibrous layer to help provide the separator 26 with appropriate structural and porosity characteristics.

In certain aspects, the separator 26 may further include one or more of a ceramic material and a heat-resistant material. For example, the separator 26 may also be admixed with the ceramic material and/or the heat-resistant material, or one or more surfaces of the separator 26 may be coated with the ceramic material and/or the heat-resistant material. In certain variations, the ceramic material and/or the heat-resistant material may be disposed on one or more sides of the separator 26. The ceramic material may be selected from the group consisting of: alumina ($Al_2O_3$), silica ($SiO_2$), and combinations thereof. The heat-resistant material may be selected from the group consisting of: Nomex, Aramid, and combinations thereof.

Various conventionally available polymers and commercial products for forming the separator 26 are contemplated, as well as the many manufacturing methods that may be employed to produce such a microporous polymer separator 26. In each instance, the separator 26 may have an average thickness greater than or equal to about 1 µm to less than or equal to about 50 µm, and in certain instances, optionally greater than or equal to about 1 µm to less than or equal to about 20 µm.

In various aspects, as noted above, the porous separator 26 and/or the electrolyte 30 disposed in the porous separator 26 as illustrated in FIG. 1 may be replaced with a solid-state electrolyte ("SSE") layer and/or semi-solid-state electrolyte (e.g., gel) layer that functions as both an electrolyte and a separator. The solid-state electrolyte layer and/or semi-solid-state electrolyte layer may be disposed between the positive electrode 24 and negative electrode 22. The solid-state electrolyte layer and/or semi-solid-state electrolyte layer facilitates transfer of lithium ions, while mechanically separating and providing electrical insulation between the negative and positive electrodes 22, 24. By way of non-limiting example, the solid-state electrolyte layer and/or semi-solid-state electrolyte layer may include a plurality of solid-state electrolyte particles, such as $LiTi_2(PO_4)_3$, $LiGe_2(PO_4)_3$, $Li_7La_3Zr_2O_{12}$, $Li_{3x}La_{2/3}$-$xTiO_3$, $Li_3PO_4$, $Li_3N$, $Li_4GeS_4$, $Li_{10}GeP_2S_{12}$, $Li_2S$—$P_2S_5$, $Li_6PS_5Cl$, $Li_6PS_5Br$, $Li_6PS_5I$, $Li_3OCl$, $Li_{2.99}Ba_{0.005}ClO$, or combinations thereof. The semi-solid-state electrolyte layer may include a polymer host and a liquid electrolyte. The polymer host may include, for example, polyvinylidene fluoride (PVDF), polyvinylidene fluoride-hexafluoropropylene (PVDF-HFP), polyethylene oxide (PEO), polypropylene oxide (PPO), polyacrylonitrile (PAN), polymethacrylonitrile (PMAN), polymethyl methacrylate (PMMA), carboxymethyl cellulose (CMC), poly(vinyl alcohol) (PVA), polyvinylpyrrolidone (PVP), and combinations thereof. In certain variations, the semi solid or gel electrolyte may also be found in the positive and/or negative electrodes 22, 24.

The negative electrode 22 may be formed from a lithium host material that is capable of functioning as a negative terminal of a lithium-ion battery. In various aspects, the negative electrode 22 may be defined by a plurality of negative electroactive material particles (not shown). Such negative electroactive material particles may be disposed in one or more layers so as to define the three-dimensional structure of the negative electrode 22. The electrolyte 30 may be introduced, for example after cell assembly, and contained within pores (not shown) of the negative electrode 22. For example, in certain variations, the negative electrode 22 may include a plurality of solid-state electrolyte particles (not shown). In each instance, the negative electrode 22 (including the one or more layers) may have a thickness greater than or equal to about 0 nm to less than or equal to about 500 µm, optionally greater than or equal to about 1 µm to less than or equal to about 500 µm, and in certain aspects, optionally greater than or equal to about 10 µm to less than or equal to about 200 µm.

In various aspects, negative electrode 22 may include a lithium-containing negative electroactive material, such as a lithium alloy and/or a lithium metal. For example, in certain variations, the negative electrode 22 may be defined by a lithium metal foil having an average thickness greater than or equal to about 0 nm to less than or equal to about 500 µm, and in certain aspects, optionally greater than or equal to about 50 nm to less than or equal to about 50 µm. In other variations, the negative electrode 22 may include, for example only, carbonaceous materials (such as, graphite, hard carbon, soft carbon, and the like) and/or metallic active materials (such as tin, aluminum, magnesium, germanium, and alloys thereof, and the like). In further variations, the negative electrode 22 may include a silicon-based electroactive material. In still further variations, the negative electrode 22 may include a combination of negative electroactive materials. For example, the negative electrode 22 may include a combination of the silicon-based electroactive material (i.e., first negative electroactive material) and one or more other negative electroactive materials. The one or more other negative electroactive materials may include, for example only, carbonaceous materials (such as, graphite, hard carbon, soft carbon, and the like) and/or metallic active materials (such as tin, aluminum, magnesium, germanium, and alloys thereof, and the like). For example, in certain variations, the negative electrode 22 may include a carbonaceous-silicon based composite including, for example, about or exactly 10 wt. % of a silicon-based negative electroactive material and about or exactly 90 wt. % graphite.

In certain variations, the negative electroactive material may be optionally intermingled (e.g., slurry cast) with one or more electronically conductive materials that provide an electron conductive path and/or at least one polymeric binder material that improves the structural integrity of the negative electrode 22. For example, the negative electrode 22 may include greater than or equal to about 10 wt. % to less than or equal to about 99 wt. %, and in certain aspects, optionally greater than or equal to about 60 wt. % to less than or equal to about 95 wt. %, of the negative electroactive material; greater than or equal to 0 wt. % to less than or equal to about 40 wt. %, and in certain aspects, optionally greater than or equal to about 0.5 wt. % to less than or equal to about 10 wt. %, of the electronically conducting material; and greater than or equal to 0 wt. % to less than or equal to about 40 wt. %, and in certain aspects, optionally greater than or equal to about 0.5 wt. % to less than or equal to about 10 wt. %, of the at least one polymeric binder.

Example polymeric binders include polyimide, polyamic acid, polyamide, polysulfone, polyvinylidene difluoride (PVdF), polyvinylidene difluoride (PVdF) copolymers, polytetrafluoroethylene (PTFE), polytetrafluoroethylene (PTFE) copolymers, polyacrylic acid, blends of polyvinylidene fluoride and polyhexafluoropropene, polychlorotrifluoroethylene, ethylene propylene diene monomer (EPDM) rubber, carboxymethyl cellulose (CMC), a nitrile butadiene rubber (NBR), styrene-butadiene rubber (SBR), lithium polyacrylate (LiPAA), sodium polyacrylate (NaPAA), sodium alginate, and/or lithium alginate. Electronically conducting materials may include carbon-based materials, powdered nickel or other metal particles, or a conductive polymer. Carbon-based materials may include, for example, particles of graphite, acetylene black (such as KETCHEN™ black or DENKA™ black), carbon nanofibers and nanotubes (e.g., single wall carbon nanotubes (SWCNT), multi-wall carbon nanotubes (MWCNT)), graphene (e.g., graphene platelets (GNP), oxidized graphene platelets), conductive carbon blacks (such as, SuperP (SP)), and the like. Examples of a conductive polymer include polyaniline, polythiophene, polyacetylene, polypyrrole, and the like.

The positive electrode 24 may be formed from a lithium-based active material that is capable of undergoing lithium intercalation and deintercalation, alloying and dealloying, or plating and stripping, while functioning as the positive terminal of a lithium-ion battery. The positive electrode 24 can be defined by a plurality of electroactive material particles (not shown). Such positive electroactive material particles may be disposed in one or more layers so as to define the three-dimensional structure of the positive electrode 24. The electrolyte 30 may be introduced, for example after cell assembly, and contained within pores (not shown) of the positive electrode 24. In certain variations, the positive electrode 24 may include a plurality of solid-state electrolyte particles (not shown). In each instance, the positive electrode 24 may have an average thickness greater than or equal to about 1 μm to less than or equal to about 500 μm, and in certain aspects, optionally greater than or equal to about 10 μm to less than or equal to about 200 μm.

In various aspects, an agglomerated (or secondary) positive electroactive material particle including a plurality of positive electroactive material particles may have an average particle diameter greater than or equal to about 1 μm to less than or equal to about 30 μm. The positive electroactive material particles may include cobalt-free, layered lithium transitional metal oxides. For example, the positive electroactive material particles may include, for example, $Li_{1+x}M_{1-x}O_2$, where $0 \leq x \leq 0.5$ and M is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. In certain variations, x=0.2 and the positive electroactive material particles may include $Li_{1.2}Ni_yMn_zO_2$, where $0.05 \leq y \leq 0.5$ and $0.3 \leq z \leq 0.75$.

In certain variations, the positive electroactive material particles, or an agglomerated of positive electroactive material particles, (independently or collectively referred to as an electroactive material core) may be coated with a lithium-containing particle coating. The lithium-containing particle coating or shell may be a substantially continuous coating. For example, the lithium-containing particle coatings may coat greater than or equal to about 85%, optionally greater than or equal to about 86%, optionally greater than or equal to about 87%, optionally greater than or equal to about 88%, optionally greater than or equal to about 89%, optionally greater than or equal to about 90%, optionally greater than or equal to about 91%, optionally greater than or equal to about 92%, optionally greater than or equal to about 93%, optionally greater than or equal to about 94%, optionally greater than or equal to about 95%, optionally greater than or equal to about 96%, optionally greater than or equal to about 97%, optionally greater than or equal to about 98%, optionally greater than or equal to about 99%, optionally greater than or equal to about 99.5%, and in certain aspects, optionally greater than or equal to about 99.8%, of a total exposed surface of the positive electroactive material particle and/or agglomerated of positive electroactive material particles. The lithium-containing particle coating or shell may have an average thickness greater than or equal to about 1 μm to less than or equal to about 10 μm, and in certain aspects, optionally greater than or equal to about 1 μm to less than or equal to about 5 μm. In each variation, a weight ratio of the positive electroactive material particles and/or agglomerated of positive electroactive material particles to the lithium-containing particle coating may be greater than or equal to about 0.1 to less than or equal to about 1.0, and in certain aspects, optionally about 0.5.

The lithium-containing particle coatings may be both an electrochemically stable and an electrochemically active coating also including layered lithium transitional metal oxides. For example, the lithium-containing particle coatings may include $Li_{1+x}M'_{1-x}O_2$, where $0 \leq x \leq 0.2$ and M' is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. In certain variations, x=0.2 and the lithium-containing particle coatings may include $Li_{1.2}Ni_yMn_zO_2$, where $0.2 \leq y \leq 0.5$ and $0.3 \leq z \leq 0.6$, wherein the lithium-containing particle coating is different from the positive electroactive material particles and/or agglomerated of positive electroactive material particles. For example, the lithium-containing particle coatings may include $Li_{1.2}Ni_{0.36}Mn_{0.44}O_2$, and the positive electroactive material particles (i.e., core material or pristine) may include $Li_{1.2}Ni_{0.24}Mn_{0.56}O_2$. That is, the positive electroactive material particles may have a first amount of manganese (Mn) and the lithium-containing particle coating may have a second amount of manganese (Mn), where the second amount of manganese (Mn) is less than the first manganese (Mn). As such, the lithium-containing particle coating may improve the electrochemical kinetics of the positive electroactive material, for example, by slowing down layered to spinel phase transition, while also mitigation manganese (Mn) dissolution at least in part because the lithium-containing particle coating does not participate in $Mn^{4+}/Mn^{3+}$ redox during cycling.

In certain variations, the positive electroactive material may be optionally intermingled (e.g., slurry cast) with one or more electronically conductive materials that provide an electron conductive path and/or at least one polymeric binder material that improves the structural integrity of the positive electrode 24. For example, the positive electrode 24 may include greater than or equal to about 10 wt. % to less than or equal to about 99 wt. %, and in certain aspects, optionally greater than or equal to about 80 wt. % to less than or equal to about 97 wt. %, of the positive electroactive material; greater than or equal to 0 wt. % to less than or equal to about 40 wt. %, and in certain aspects, optionally greater than or equal to about 1.5 wt. % to less than or equal to about 10 wt. %, of the electronically conducting material; and greater than or equal to 0 wt. % to less than or equal to about 40 wt. %, and in certain aspects, optionally greater than or equal to about 1.5 wt. % to less than or equal to about 10 wt. %, of the at least one polymeric binder.

In various aspects, the present disclosure provide method for coating the positive electroactive material particles. The method may include contacting precursor positive electroactive material particles and one or more coating materials to form a precursor assembly. In certain variations, the contacting may include co-precipitating the coating materials onto the positive electroactive material particles. The precursor positive electroactive material particles may include, for example, $Ni_xMn_yCO_3$, where $0.1 \leq x \leq 0.5$ and $0.5 \leq y \leq 0.9$ and $x+y=1.0$. The one or more coating materials may include, for example, $Ni_xMn_yCO_3$, where $0.25 \leq x \leq 0.6$ and $0.4 \leq y \leq 0.75$ and $x+y=1.0$. For example, in certain variations, the precursor positive electroactive material particles may include, for example, $Ni_{0.3}Mn_{0.7}CO_3$, and the one or more coating materials may include, for example, $Ni_{0.45}Mn_{0.55}CO_3$.

The method may further include contacting the precursor assembly and one or more lithium salts to form coated positive electroactive material particles. In certain variations, the contacting may include submerging the precursor assembly in a solution including the one or more lithium salts. In various aspects, the one or more lithium salts may be selected from the group consisting of: lithium hydroxide (LiOH), lithium carbonate ($Li_2CO_3$), lithium hexafluorophosphate ($LiPF_6$), lithium perchlorate ($LiClO_4$), lithium tetrachloroaluminate ($LiAlCl_4$), lithium iodide (LiI), lithium bromide (LiBr), lithium thiocyanate (LiSCN), lithium tetrafluoroborate ($LiBF_4$), lithium tetraphenylborate ($LiB(C_6H_5)_4$), lithium bis(oxalato)borate ($LiB(C_2O_4)_2$) (LiBOB), lithium difluorooxalatoborate ($LiBF_2(C_2O_4)$), lithium hexafluoroarsenate ($LiAsF_6$), lithium trifluoromethanesulfonate ($LiCF_3SO_3$), lithium bis(trifluoromethane)sulfonylimide ($LiN(CF_3SO_2)_2$), lithium bis(fluorosulfonyl)imide ($LiN(FSO_2)_2$) (LiSFI), and combinations thereof.

In other variations, the present disclosure provides a method for preparing coated positive electroactive material particles. The method may include preparing an aqueous solution including, for example, lithium nitrate or acetate, manganese nitrate or acetate, and/or nickel nitrate or acetate and citric acid. The method further includes contacting the aqueous solution and positive electroactive material particles represented, for example, by $Li_{1+x}M_{1-x}O_2$, where $0 \leq x \leq 0.5$ and M is selected from the group consisting of: nickel (Ni), manganese (Mn), iron (Fe), tungsten (W), molybdenum (Mo), vanadium (V), zirconium (Zr), niobium (Nb), aluminum (Al), magnesium (Mg), and combinations thereof. In certain variations, the contacting may include submerging the positive electroactive material particles in the aqueous solution to form a slurry. The method may include drying the slurry and calcining the solid, for example, at a temperature of about 900° C. for about 10 hours in air.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A positive electrode material comprising:
  an electroactive material core comprising $Li_{1+x}M_{1-x}O_2$, where $0 \leq x \leq 0.5$ and M is selected from the group consisting of: iron (Fe), tungsten (W), molybdenum (Mo), vanadium (V), zirconium (Zr), niobium (Nb), aluminum (Al), magnesium (Mg), and combinations thereof; and
  an electrochemically active coating surrounding the electroactive material core, the electrochemically active coating comprising $Li_{1+x}M'_{1-x}O_2$, where $0 \leq x \leq 0.2$ and M' is selected from the group consisting of: iron (Fe), tungsten (W), molybdenum (Mo), vanadium (V), zirconium (Zr), niobium (Nb), aluminum (Al), magnesium (Mg), and combinations thereof, the electrochemically active coating being a distinct composition from the electroactive material core.

2. The positive electrode material of claim 1, wherein the electroactive material core has an average particle diameter greater than or equal to about 1 micrometer to less than or equal to about 30 micrometers, and the electrochemically active coating has an average thickness greater than or equal to about 1 micrometer to less than or equal to about 10 micrometers.

3. The positive electrode material of claim 1, wherein the electrochemically active coating covers greater than or equal to about 85% of a total surface area of the electroactive material core.

4. An electrochemical cell that cycles lithium ions, the electrochemical cell comprising:
  a positive electrode comprising a plurality of positive electroactive material particles, each of the positive electroactive material particles comprising an electroactive material core and an electrochemically active coating that surrounds the electroactive material core, the electroactive material core comprising $Li_{1+x}M_{1-x}O_2$, where $0 \leq x \leq 0.5$, where M is selected from the group consisting of: iron (Fe), tungsten (W), molybdenum (Mo), vanadium (V), zirconium (Zr), niobium (Nb), aluminum (Al), magnesium (Mg), and combinations thereof, and the electrochemically active coating comprising $Li_{1+x}M'_{1-x}O_2$, where $0 \leq x \leq 0.2$ and M' is selected from the group consisting of: iron (Fe), tungsten (W), molybdenum (Mo), vanadium (V), zirconium (Zr), niobium (Nb), aluminum (Al), magnesium (Mg), and combinations thereof, the electrochemically active coating being a distinct composition from the electroactive material core;
  a negative electrode; and
  a separating layer physically separating the positive electrode and the negative electrode.

5. The electrochemical cell of claim 4, wherein the electroactive material core has an average particle diameter greater than or equal to about 1 micrometers to less than or equal to about 30 micrometers, and the electrochemically active coating has an average thickness greater than or equal to about 1 micrometer to less than or equal to about 10 micrometers.

6. The electrochemical cell of claim 4, wherein the electrochemically active coating covers greater than or equal to about 85% of a total surface area of the electroactive material core.

* * * * *